Patented July 13, 1954

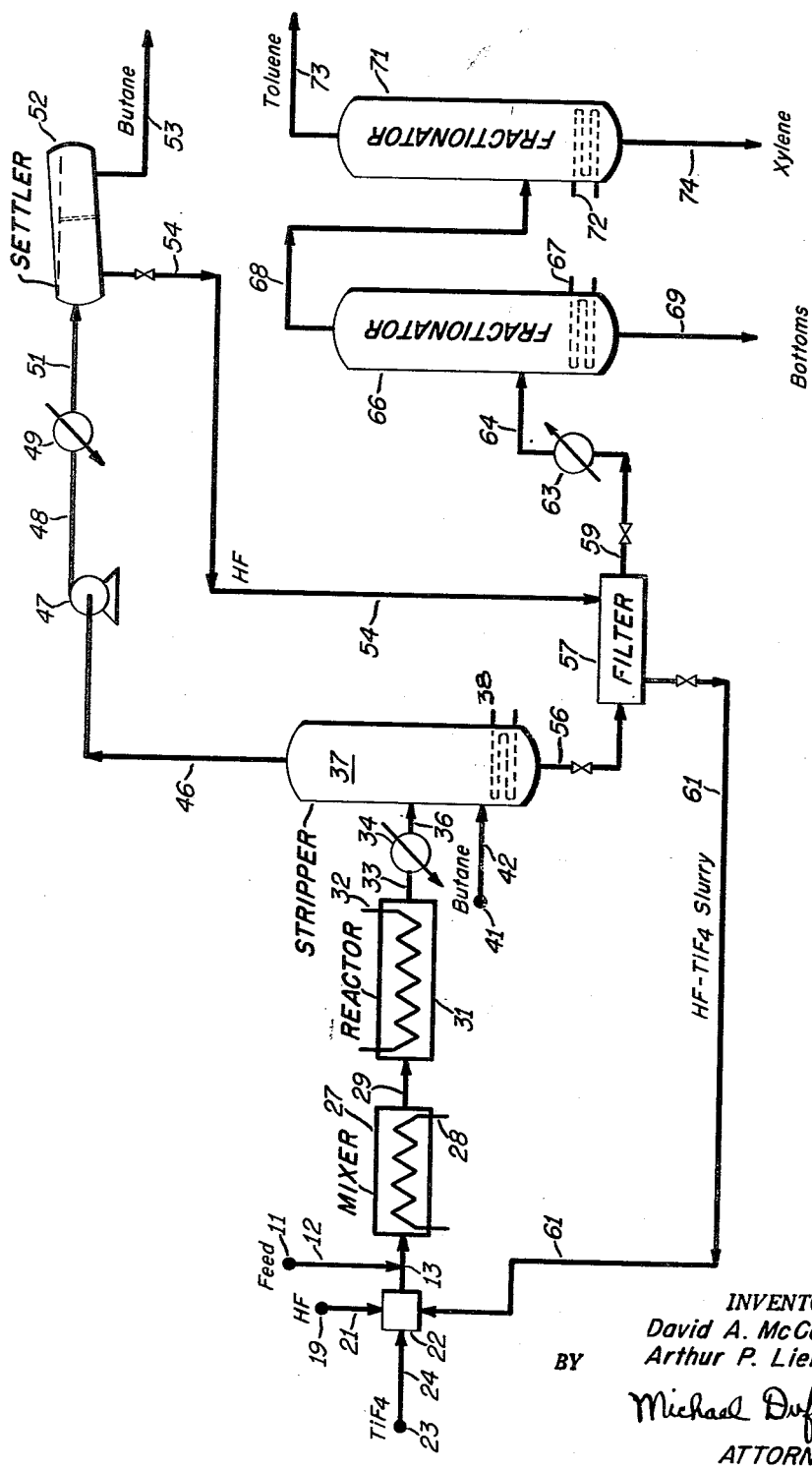

2,683,758

UNITED STATES PATENT OFFICE 2,683,758

XYLENE ISOMERIZATION UTILIZING A TiF₄-HF CATALYST

David A. McCaulay, Chicago, Ill., and Arthur P. Lien, Highland, Ind., assignors to Standard Oil Company, Chicago, Ill., a corporation of Indiana Application April 30, 1952, Serial No. 285,211

11 Claims. (Cl. 260—668)

This invention relates to the isomerization of para-xylene, ortho-xylene or a mixture of $C_8$ aromatics. More particularly, it relates to the production of meta-xylene by the isomerization of para-xylene and/or ortho-xylene. Still more particularly, it relates to the isomerization of para-xylene, ortho-xylene or mixtures of $C_8$ aromatics in the presence of a catalyst consisting essentially of liquid hydrogen fluoride and titanium tetrafluoride.

The present commercial polystyrene resins have a softening point below the boiling point of water. This defect has encouraged a search for resins of this type with higher softening point. It has been found that substantially pure dimethylstyrene polymerizes to a resin with a softening point in excess of 100° C. In the high temperature dehydrogenation of ethylxylenes to produce dimethylstyrenes, 1,3,5-ethylxylene has been found to be a preferred feed stock. High purity meta-xylene is valuable as a starting material for this synthesis. An object of this invention is the production of a high purity meta-xylene fraction suitable for this use.

Another object of this invention is to effect xylene isomerization without encountering an excessive amount of side reactions such as cracking and disproportionation. Other objects will be apparent as the detailed description of the invention proceeds.

It has been discovered that ortho-xylene and/or para-xylene can be isomerized to meta-xylene by treating with liquid HF and TiF₄ at a temperature below 185° F. for a time sufficient to convert an appreciable amount of the feed xylene to the meta-xylene isomer.

It has been previously discovered that polyalkylbenzenes, such as xylene, diethylbenzene and ethylxylene, react with liquid HF and titanium tetrafluoride to form complexes containing 2 mols of TiF₄ and probably 1 mol of HF for each mol of polyalkylbenzene. It is believed that HF is present in the complex because no complex is formed between TiF₄ and xylene in the absence of liquid HF. Under the conditions of this process benzene, toluene and ethylbenzene do not form a complex with TiF₄ and liquid HF. The complex is extremely soluble in liquid HF. Sufficient liquid HF must be present in the reaction zone to form the complex and also to dissolve the complex itself.

The liquid HF used in the process should be substantially anhydrous, i. e., the liquid HF should not contain more than about 1 to 2% of water. The amount of liquid HF needed in the process is between at least about 2 mols and about 50 mols per mol of xylene present in the feed. Put in another way, the amount of liquid HF used should be between about 40 and 1,000 volume percent, based on xylene. Preferably, the liquid HF should be between about 100 and 500 volume percent.

The presence of a TiF₄-HF-xylene complex in the liquid HF markedly increases the solubility of non-complexible aromatics in the liquid HF; examples of non-complexible aromatics are benzene, toluene and ethylbenzene. Apparently the complex acts as a solubility promoter for the non-complexible aromatic hydrocarbons because the amount of these aromatic hydrocarbons which can be dissolved increases with increase in the amount of complex present in the liquid HF. Liquid HF and TiF₄ rapidly disproportionate ethylbenzene to diethylbenzene; the diethylbenzene complexes with TiF₄ and HF and passes into solution in the form of a complex, thereby resulting in an apparent increase in solubility of ethylbenzene.

While some degree of isomerization will take place when using only very slight amounts of TiF₄, the degree of isomerization increases with increase in amount of TiF₄ present. The amount of TiF₄ present may vary from about 0.1 mol per mol of xylene in the feed to as much as 4 or 5 mols. It is preferred to limit the TiF₄ usage to the amount that will be present in the HF, either in the form of a complex, or in physical solution therein. The presence of a separate solid phase of TiF₄ is undesirable because the solid TiF₄ appears to promote side reactions such as disproportionation. When operating on a mixture of $C_8$ aromatic hydrocarbons, it is preferred to add to the reaction zone sufficient incremental TiF₄ to complex with the diethylbenzene produced by disproportionation of ethylbenzene, i. e., about 1 mol of TiF₄ per mol of ethylbenzene in the feed.

It has been found that the total reaction product will not contain meta-xylene in an amount substantially in excess of the thermodynamic equilibrium, about 60 mol percent based on xylenes, when two liquid phases are present in the reaction zone. By two liquid phases, it is intended to mean an HF-rich phase comprising liquid HF, complex, dissolved aromatic hydrocarbons and dissolved TiF₄, and a hydrocarbon phase comprising non-complexed hydrocarbons as well as non-complexible hydrocarbons, such as, paraffinic hydrocarbons, benzene, toluene and ethylbenzene. Even in the absence of non-complexible hydrocarbons, the presence of the second liquid phase has an adverse effect on the degree of isomerization obtainable. It has been found that best results are attainable in this process when the operation is carried out in a single homogeneous liquid phase, i. e., when all the feed hydrocarbons and substantially all the $TiF_4$ are dissolved in the HF-rich phase either as a complex, or in physical solution. In order to attain a single homogeneous phase, it is necessary to use about 1.7 mols of $TiF_4$ per mol of xylene present in the feed (and about 1 mol of $TiF_4$ per mol of ethylbenzene present in the feed); in general, optimum results will be attained when about 2 mols of $TiF_4$ are used per mol of xylene in the feed.

The temperature at which the treatment is carried out is of importance in the degree of isomerization attained and the yield of undesired by-products such as $C_9$ and $C_{10}$ aromatic hydrocarbons. The reaction temperature should be maintained below 185° F., in order to keep to a minimum the production of $C_9$ and $C_{10}$ aromatic hydrocarbons and also to decrease the tendency for cracking reactions to take place. Temperatures as low as 0° F. can be used if the correspondingly longer reaction time needed to obtain an appreciable degree of isomerization can be tolerated. Higher temperatures favor a degree of isomerization in excess of the thermodynamic equilibrium content of meta-xylene. It is preferred to operate at a temperature between about 70° and 100° F.

The time for which the reaction must be carried out is closely related to the temperature at which the reaction is being carried out; the higher the temperature, the shorter the reaction time necessary to reach an equivalent degree of isomerization. When operating at temperatures of about 0° F., reaction time may be as long as 50 hours. When operating at about 180° F., in about 10 minutes' time equilibrium conditions will be reached wherein as much as 80% of the xylenes in the total product will be the meta-isomer.

In a homogeneous system the isomerization of para-xylene or ortho-xylene reaches the equilibrium composition at about 100° F., in about 60 to 90 minutes. As the reaction temperature is decreased, the length of time needed to reach equilibrium increases so that at about 70° F., the reaction time must be between about 100 and 150 minutes.

The above reaction times apply to the case of maximum possible conversion to the meta-isomer. Product mixtures containing less than a maximum amount of meta-isomer can be obtained by decreasing the reaction time. Thus appreciable yields of meta-isomer can be obtained by treating the para-isomer or the ortho-isomer with liquid HF and $TiF_4$ at a temperature between about 70° and 100° F., for a time between about 5 minutes and 150 minutes.

The feed to this process may consist of a mixture of $C_8$ aromatic hydrocarbons and non-aromatic hydrocarbons, e. g., a narrow boiling range cut obtained from petroleum distillate or from the so-called hydroforming of petroleum distillates; or the feed to the process may consist of a mixture of $C_8$ aromatic hydrocarbons substantially free of other hydrocarbons; or the feed may consist of para-xylene or ortho-xylene. The presence of non-complexible aromatic hydrocarbons and paraffinic hydrocarbons has an adverse effect on the degree of isomerization attainable. These non-complexible hydrocarbons extract from the HF phase some of the uncomplexed xylenes, and also some of the complexed xylenes. Even when a high degree of intermingling of the two phases is obtained, substantially no isomerization of the xylenes occurs in the hydrocarbon phase. It is preferred to operate on a feed stock comprising essentially para-xylene or ortho-xylene, or a mixture of $C_8$ aromatic hydrocarbons.

The accompanying drawing shows one embodiment of this process for the production of a mixture of xylenes containing in excess of the equilibrium amount of meta-xylene by the isomerization of the ortho and para-xylene contained in a mixture of $C_8$ aromatic hydrocarbons. It is to be understood that this embodiment is shown for purposes of illustration only and that many other variations of this process can be readily devised by those skilled in the art. It is to be further understood that pumps, numerous valves and other pieces of process equipment have been omitted because these can be readily supplied to the embodiment by those skilled in the art.

In this illustration the charge consists of a mixture of ortho-xylene, meta-xylene, para-xylene and ethylbenzene which was derived from the product of the hydroforming of a virgin naphtha. The charge contains about 45% of ortho and para-xylene, 15% of ethylbenzene and the remainder meta-xylene. The feed from source 11 is passed through line 12 into line 13.

Liquid HF from source 19 is passed by way of line 21 into vessel 22, which vessel 22 is provided with agitating means not shown. Finely divided $TiF_4$ from source 23 is passed by way of line 24 into vessel 22. Many methods are known for introducing a finely divided solid into a line and for conveying the material into a closed vessel, e. g., storage 23 may be equipped with a star valve at the exit thereof and line 24 may be equipped with conveying flights for moving the solid. In vessel 22 the liquid HF and the $TiF_4$ form a slurry, as in this case more $TiF_4$ is used than is soluble in the liquid HF. This slurry is passed from vessel 22 into line 13 where it meets the feed from line 12.

In this illustration there are used 300 volume percent of liquid HF based on xylene in the feed, and 2 mols of $TiF_4$ per mol of xylene present in the feed and 1 mol of $TiF_4$ per mol of ethylbenzene present in the feed. The contents of line 13 are passed into mixer 27, which mixer is provided with a heat exchange coil 28. The reaction of the HF, $TiF_4$ and xylene to form the complex is exothermic and the heat exchange coil 28 is provided to enable the temperature of the reaction mixture to be controlled. In mixer 27 the liquid HF, $TiF_4$ and feed are agitated and form a single homogeneous liquid phase consisting essentially of liquid HF, complexed-xylene, free-xylene and ethylbenzene.

The reaction mixture is passed from mixer 27 through line 29 into reactor 31. Reactor 31 is provided with a heat exchange coil 32. In this example the reaction is carried out at a temperature of about 90° F., for a reaction time of about 100 minutes. These conditions are sufficient to produce a mixed xylene product containing about 80 mol percent of meta-isomer.

The contents of reactor 31 are passed through line 33, heat exchanger 34 and line 36 into stripper 37 which is provided with internal heater 38. The contents of reactor 31 may be cooled quickly in exchanger 34 in order to decrease the degree of disproportionation of the xylene which takes place to some extent at this temperature. In stripper 37 the complex is decomposed by removing the HF. In order to avoid the formation of undesirable by-products through disproportionation and cracking, the removal of the HF is carried out under vacuum. The HF removal operation is facilitated by the use of a stripping agent. Here butane from source 41 is passed by way of line 42 into stripper 37 near the bottom thereof. The stripping agent should be substantially inert to the catalytic action of HF.

The HF and butane vapors pass out of stripper 37 through line 46, vacuum pump 47, line 48 into cooler 49. In cooler 49 the HF and butane are condensed and the liquid is passed by way of line 51 into settler 52. The upper layer of butane is separated from the lower layer of HF in settler 52 and is recycled to line 42 by way of line 53 and other lines not shown. The lower HF layer is withdrawn from settler 52 by way of valved line 54.

In the bottom of stripper 37 there appears upon the removal of the HF a slurry of extremely finely divided $TiF_4$ in the hydrocarbon reaction products. The particle size of the $TiF_4$ varies somewhat with the operation of stripper 37 and may in some cases be almost colloidal in nature. The slurry of $TiF_4$ and hydrocarbons is withdrawn from stripper 37 by way of valved line 56 and is passed into filter 57. Filter 57 may be any type of HF-resistant and HF vapor tight filter which is adapted to the removal of extremely finely divided solids. Instead of a filter a centrifugal separator may be used. The $TiF_4$ is retained in filter 57 and the hydrocarbons are passed into valved line 59. It is to be understood that even though only one filter is shown, for continuous operation two or more filters would be used.

The $TiF_4$ is removed from filter 57 by means of a backwashing operation with liquid HF from line 54. The slurry of liquid HF and $TiF_4$ is passed from filter 57 by way of valved line 61 to vessel 22 for reuse in the process.

The hydrocarbons pass out of filter 57 through valved line 59 through heater 63 and line 64 into fractionator 66, which is provided with reboiler 67. In fractionator 66, benzene, toluene, xylene and very small amounts of ethylbenzene are taken overhead through line 68. Remaining in the bottom of fractionator 66 is a mixture of trimethylbenzene, diethylbenzene, ethylxylene and some tetramethylbenzene. These higher boiling aromatic hydrocarbons are withdrawn from fractionator 66 by way of line 69 and are sent to storage not shown.

The benzene, toluene and xylene overhead from fractionator 66 are passed through line 68 into fractionator 71, which is provided with reboiler 72. In fractionator 71 a nitration grade benzene and toluene fraction is taken overhead through line 73 and is sent to storage not shown. A xylene product which contains about 80 mol percent of metaxylene is withdrawn from the bottom of fractionator 71 through line 74 and is sent to storage not shown. The meta-xylene content of this product may be increased by fractionating out the ortho-xylene content of the product.

Although a filter technique has been shown for the separation of $TiF_4$ from the reaction product other methods may be utilized, e. g., the slurry of $TiF_4$ and reaction products may be passed from stripper 37 through a heat exchanger and passed into a flash chamber where the hydrocarbons are taken overhead, leaving $TiF_4$ behind. The $TiF_4$ may then be removed from the flash chamber by slurrying with HF. This flashing technique may be made continuous by using two flash chambers operating alternately. Other methods of making this separation can be readily devised by those skilled in the art.

The following runs illustrate the experimental procedure used and the results obtainable by this process. The runs were carried out in a 1570 ml. carbon steel autoclave fitted with a 1725 rpm stirrer. The desired amounts of $TiF_4$, xylene and liquid HF were added to the reactor. The temperature of the reactor contents was maintained at a selected temperature for a selected reaction time. The contents of the reactor were withdrawn into a Dry-Ice cooled flask containing crushed ice. The flask containing the reaction products was allowed to warm to room temperature. The supernatant hydrocarbons—displaced from their $TiF_4$-HF complexes by the water—were separated from the aqueous acid phase. The hydrocarbons were washed with dilute aqueous caustic to remove traces of HF. The reaction products were fractionated to a number of close boiling cuts by means of a 30 theoretical plate column. Each cut was analyzed by ultraviolet absorption or infrared absorption, together with refractive index and specific gravity measurements. The data for runs 1, 2 and 3 are presented below:

| Run No. | 1 | | 2 | | 3 | |
|---|---|---|---|---|---|---|
| Temperature, °F | 50 | | 151 | | 151 | |
| Contact Time, Minutes | 90 | | 30 | | 30 | |
| | ml. | mols | ml. | mols | ml. | mols |
| Reactor Charge: | | | | | | |
| p-xylene | 250 | 2.0 | 200 | 1.6 | 200 | 1.6 |
| HF | 170 | 8.5 | 500 | 25.0 | 500 | 25.0 |
| $TiF_4$ | 515 g. | 4.2 | 397 g. | 3.2 | 37 g. | 0.3 |
| | Total | $C_8$ | Total | $C_8$ | Total | $C_8$ |
| Product Distribution, mol percent: | | | | | | |
| Toluene | 6.0 | | 8.7 | | 4.4 | |
| o-xylene | | | 5.0 | 6.5 | 5.6 | 6.4 |
| m-xylene | 57.5 | 67.5 | 66.3 | 87.0 | 31.9 | 36.2 |
| p-xylene | 27.7 | 32.5 | 5.0 | 6.5 | 50.6 | 47.5 |
| $C_9$ aromatics | 8.8 | | 11.2 | | 6.2 | |
| $C_{10}$ aromatics | | | 3.8 | | 1.3 | |
| p-xylene, percent isomerized | 57 | | 71 | | 37 | |
| p-xylene, percent disproportionated | 15 | | 24 | | 12 | |

Runs 1 and 2 shows the effect of temperature when operating in a homogeneous phase system. In run 2 the contacting time was only one-third that in run 1. Nevertheless the xylene fraction contained 87% of the meta-isomer. However, run 2 showed a very large percentage increase of the undesired $C_9$ and $C_{10}$ aromatic hydrocarbons. Run 3 shows the effect of operating with amounts of $TiF_4$ insufficient to form a single homogeneous phase. Not only is the conversion lowered, but the relative amount of $C_9$ and $C_{10}$ aromatics is much increased over operation in the homogeneous phase.

This application is a continuation-in-part of our application S. N. 258,918, filed November 29, 1951, and entitled "Refining of Hydrocarbon Oils with HF and $TiF_4$."

Having described the invention, what is claimed is:

1. A process for the production of meta-xylene from the other isomeric xylenes, which process comprises contacting under substantially anhydrous conditions said xylenes with an effective amount of TiF₄ and an amount of liquid HF sufficient to form an HF-rich phase containing substantially all of said xylenes, at a temperature below 185° F. for a time sufficient to produce an appreciable amount of the meta-isomer, and removing HF and TiF₄ from the meta-xylene containing product.

2. The process of claim 1 wherein the feed to the process consists essentially of a mixture of C₈ aromatics.

3. The method of claim 1 wherein the liquid HF is present in an amount between about 100 and 500 volume percent based on said xylenes.

4. The method of claim 1 wherein said temperature of contacting is between about 70° and 100° F. and the time of contacting is between about 60 minutes and 150 minutes, the shorter time corresponding to the higher temperature.

5. The method of claim 1 wherein the feed to the process consists essentially of para-xylene.

6. The method of claim 1 wherein the feed to the process consists essentially of ortho-xylene.

7. A process which comprises contacting under substantially anhydrous conditions a feed comprising essentially a member of the class consisting of ortho-xylene, para-xylene, mixtures thereof and mixtures of meta-xylene and at least one other xylene isomer wherein the meta-xylene is present in an amount appreciably less than the theoretical thermodynamic equilibrium amount, with at least sufficient TiF₄ and at least sufficient liquid HF to form a single phase homogeneous solution of said feed in said liquid HF, maintaining said solution at a temperature between about 0° and 185° F. for a time sufficient to produce a reaction product mixture containing an amount of meta-xylene appreciably greater than the theoretical thermodynamic equilibrium amount, and removing the HF and TiF₄ from the reaction product mixture.

8. The process of claim 7 wherein said product mixture contains at least about 80 mol per cent of meta-xylene in the xylene product fraction.

9. The process of claim 7 wherein said feed is para-xylene.

10. The process of claim 7 wherein the temperature of contacting is between about 70° and 100° F., and the time of contacting is between about 60 and 150 minutes, the shorter time corresponding to the higher temperature.

11. The process of claim 10 wherein the amount of TiF₄ is about 2 mols per mol of feed xylene.

References Cited in the file of this patent:

UNITED STATES PATENTS

| Number | Name | Date |
|---|---|---|
| 2,514,866 | Hovey | July 11, 1950 |
| 2,521,444 | Brooke et al. | Sept. 5, 1950 |